UNITED STATES PATENT OFFICE.

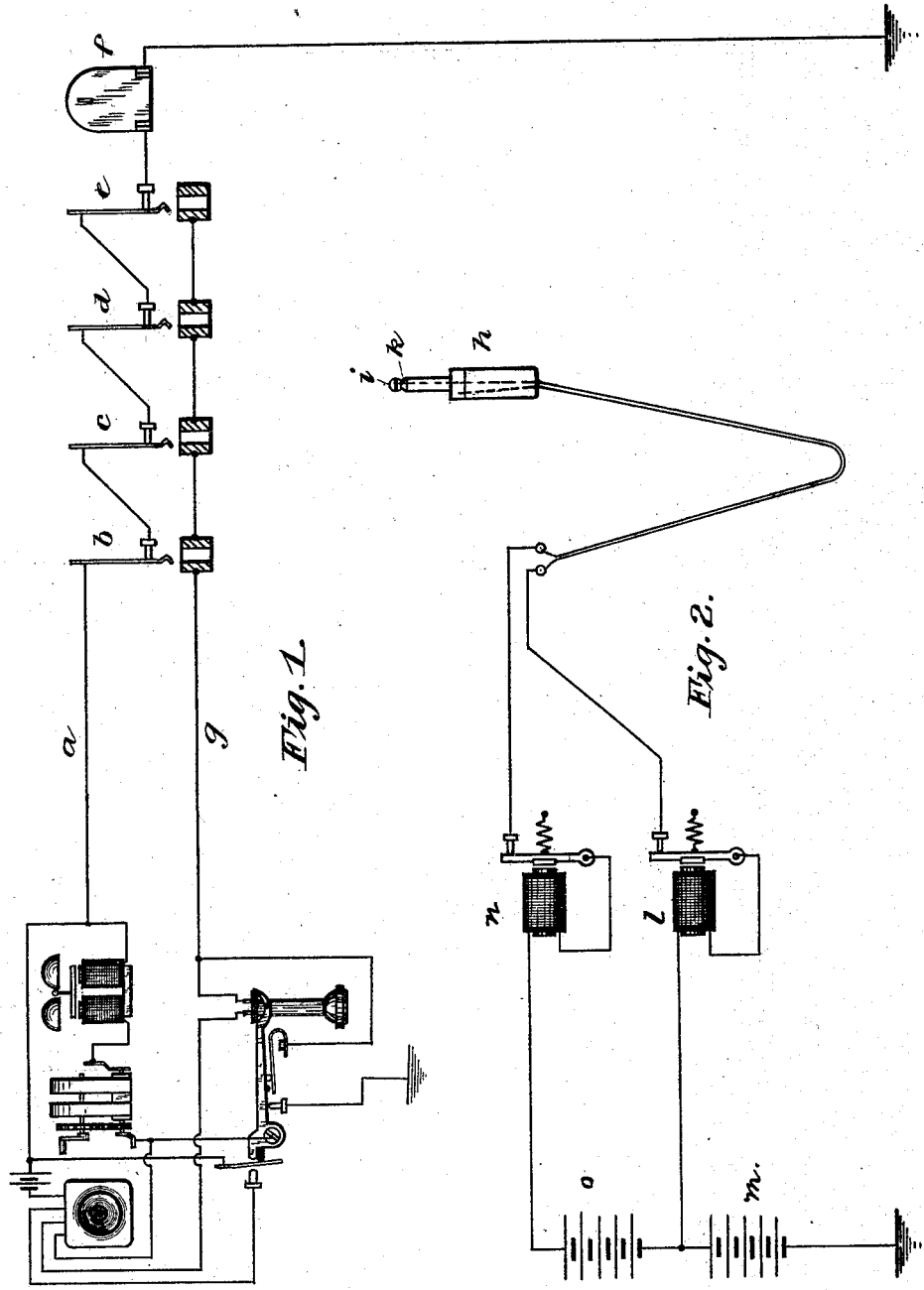

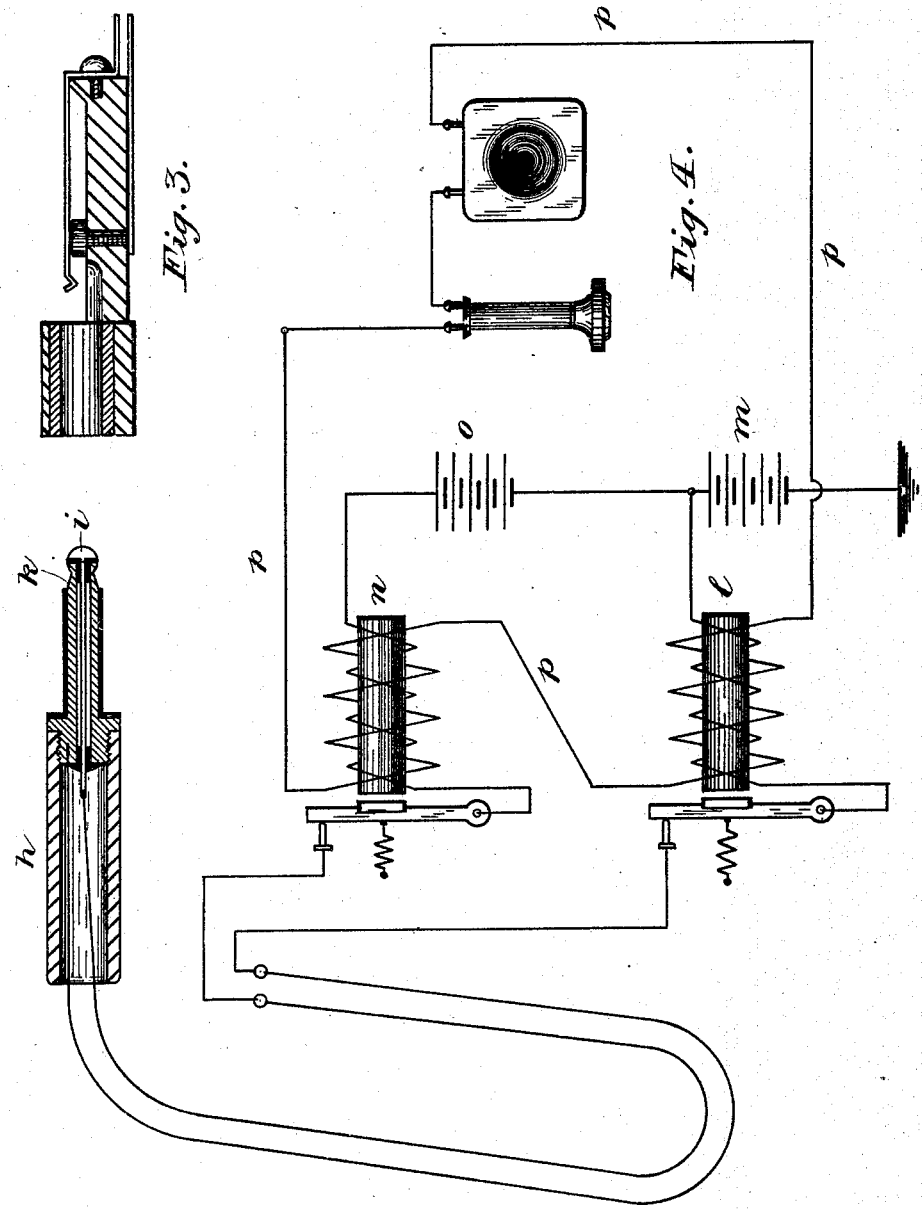

CHARLES E. SCRIBNER, OF CHICAGO, ILLINOIS, ASSIGNOR TO THE WESTERN ELECTRIC COMPANY, OF SAME PLACE.

TEST-CIRCUIT FOR MULTIPLE SWITCH-BOARDS.

SPECIFICATION forming part of Letters Patent No. 416,809, dated December 10, 1889.

Application filed June 1, 1888. Serial No. 275,755. (No model.)

*To all whom it may concern:*

Be it known that I, CHARLES E. SCRIBNER, a citizen of the United States, residing at Chicago, in the county of Cook and State of Illinois, have invented a certain new and useful Improvement in Test-Circuits for Multiple Switch-Boards, (Case 159,) of which the following is a full, clear, concise, and exact description, reference being had to the accompanying drawings, forming a part of this specification.

The object of my invention is to provide ready means of testing a circuit containing several spring-jack switches—as in multiple switch-board systems—to determine at one switch whether the line is open or connected with another line.

My invention consists of two buzzers or indicating devices in different circuits and batteries connected therewith, and a test-plug having two terminals, one terminal being connected with the circuit of one indicating device and the other terminal being connected with the circuit of the other indicating device, the test-plug being of such form and the indicating devices being so adjusted with respect to resistance and current that when the test-plug is inserted in any spring-jack of a line not in use the two indicating devices will respond one after the other. If, however, the line tested is open or connected with another line on either side of the spring-jack at which the test is made, only one of said signal-indicating devices will respond.

In the accompaning drawings, Figure 1 is a view of a telephone-line circuit passing through four different spring-jack switches and an annunciator to ground in one of the well-known ways. Fig. 2 is a diagram illustrative of my testing apparatus. Fig. 3 is a detailed view of an ordinary spring-jack switch. Fig. 4 is a view of my testing apparatus, a telephone being shown connected in circuit, with extra windings upon the magnets of the indicating devices.

Like parts are indicated by similar letters of reference in the different figures.

Referring to Fig. 1, the telephone-line $a$ extends from ground at the subscriber's station through spring-jack switches $b$, $c$, $d$, and $e$ and annunciator $f$ to ground at the central office in one of the well-known ways. The return portion $g$ of the circuit is shown connected in the usual way with the insulated frames or sockets of said switches. In case single circuits were used, this wire $g$ and the sockets would be unnecessary. These insulated sockets have been generally termed the "test-pieces," since in the ordinary method of testing they formed an important part of the test apparatus, as is shown in my Patent No. 305,021. In my system herein described, however, they have no function in the matter of testing, and are only useful as the terminals for one limb of the metallic circuit in metallic-circuit systems.

The test-plug $h$ is provided with two terminals $i$ and $k$. These terminals are of such shape that when the test-plug is inserted in a spring-jack switch they will be successively connected with the switch-lever. In case the spring-jack is of the usual form shown in Fig. 3, the terminals of the test-plug will be of the form shown in the drawings, Figs. 2 and 4, so that the extreme point or terminal $i$ will first connect with the lever of the switch, and then, as the plug is inserted farther, will be disconnected therefrom, allowing the switch-lever to close upon the neck or terminal $k$ of the plug. The shank of the plug is insulated by a rubber sleeve, as shown more clearly in Fig. 4, so that when inserted it forms no connection with the tube or socket thereof.

The annunciator $f$ (see Fig. 1) may be of, say, fifty ohms resistance. The buzzer or indicator $l$ (see Fig. 2) may be wound to the same resistance and so adjusted with respect to the current of battery $m$ that it will respond—that is, be set in vibration—when the circuit of battery $m$ is closed through the coil of buzzer $l$ and a circuit having a resistance equal to the resistance of annunciator $f$ to ground. If, however, the resistance of the circuit is increased substantially above fifty ohms—that is to say, above the resistance of the annunciator—the adjustment of the buzzer $l$ is such that said buzzer will not respond. The indicating device or buzzer $n$ is wound to a much higher resistance—say to a resistance of two hundred and fifty ohms—and the battery $o$ connected with its circuit is of such electro-motive force that the indicating device $n$ will be set in vibration when its circuit is closed through a resistance greater than fifty ohms—say through a resistance of five hundred or one thousand ohms.

In order to test the circuit with my apparatus, it is only necessary to insert the test-plug in any switch of the line, and at the same time to observe the testing devices $l$ $n$. Suppose the test-plug $h$ of Fig. 2 inserted in the spring-jack switch $d$ of Fig. 1 and suppose the other spring-jack switches $b$, $c$, and $e$ of the line to be closed, as shown. When the tip $i$ of the plug is connected with the lever of switch $d$, indicating device $l$ will respond. On inserting the plug farther the lever of switch $d$ would be lifted from its contact-point and the circuit of indicating device $n$ would be connected through the other terminal of the plug to said lever. The circuit being thus formed through indicator $n$ over the line to the subscriber's station, said indicator would respond. Thus, if the line were free, one observing the two indicating devices would note that both responded, one immediately after the other. If, however, when the test were made the line should be open at switch $e$, or if a connection were made at switch $e$ with any line having a resistance of, say, four hundred ohms, the resistance of the circuit would be so great that indicator $l$ would not respond when the terminal of its circuit was closed to the lever of switch $d$. If, however, the circuit were open at switch $b$ or $c$ in front of switch $d$, then indicating device $l$ would respond; but on inserting the test-plug farther, so as to lift the lever of switch $d$ from its contact and to close the circuit of indicating device $n$, said indicating device $n$ would not respond, because its circuit would be open at the switch in front of switch $d$, at which the connection had been made. Thus, if the line is free, both indicating devices will respond, one after the other. If the line be open back of the switch at which the test is made, the indicating device of low resistance $l$ will not respond, but the indicating device $n$, of high resistance, will respond. If, however, the circuit is open, or if a connection is made therewith at a spring-jack in front of the switch at which the test is made, indicating device $l$ will respond; but on inserting the plug farther no response will be made by indicating device $n$, of high resistance.

In Fig. 4 I have shown a circuit $p$, including a telephone and an extra coil upon the magnets of indicating devices $l$ and $n$. By listening at the telephone when the tests are made it may be readily determined whether one or both instruments respond. The indicating devices $l$ and $n$ will be adjusted to give different tones in the telephone.

The telephone as thus connected with the buzzers in Fig. 4 is not essential to my invention. Any other way of determining whether the buzzers were set in vibration on applying the test-plug may be used. The buzzers might be placed directly in front of the operator, and the operator might determine by the eye or ear directly whether or not they were actuated.

It will be understood that I do not limit my invention to the precise construction shown, but claim, broadly—

1. The combination, with a circuit containing several spring-jack switches and an annunciator, of a testing device consisting of two circuits, each containing a buzzer or indicating device, said circuits being connected to different terminals of a test-plug constructed to be inserted in a spring-jack of the line and make successive connections with the lever of the spring-jack in which it is inserted, and batteries in circuit with said indicating devices, the resistance of the annunciator of the line being substantially equal to the resistance of the coils of one of said indicating devices and substantially lower than the resistance of the coils of the other of said indicating devices, whereby on inserting the plug in a spring-jack of the line it may be determined whether the line is open or connected at any other of the spring-jack switches.

2. The testing apparatus consisting of two buzzers or indicators having coils of different resistance, the resistance of one being comparatively low—say fifty ohms—and the resistance of the coil of the other being comparatively high—say two hundred and fifty ohms—in combination with battery-circuits, one through each of said indicating devices or buzzers, said circuits being connected, respectively, with different terminals of a plug through different strands of a flexible cord, substantially as described.

3. The testing apparatus consisting of the buzzer $l$, of low resistance, and a circuit extending from ground through a battery and the coils and armature-lever of said buzzer to the terminal $i$ of test-plug $h$, in combination with the buzzer $n$, of high resistance, and a circuit passing from ground through a battery of high electro-motive force, including the coil and armature-lever of said buzzer $n$, and extending to the terminal $k$ of said plug, substantially as described.

In witness whereof I hereunto subscribe my name this 15th day of March, A. D. 1888.

CHARLES E. SCRIBNER.

Witnesses:
 CHAS. G. HAWLEY,
 CHAS. C. WOODWORTH.